United States Patent
Wade

(10) Patent No.: US 6,277,933 B1
(45) Date of Patent: *Aug. 21, 2001

(54) POLYACRYLONITRILE PARTICLES BY SURFMER POLYMERIZATION AND SODIUM REMOVAL BY CHEMICAL EXCHANGE

(75) Inventor: Bruce E. Wade, Decatur, AL (US)

(73) Assignee: Solutia Inc., St. Louis, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,915

(22) Filed: Apr. 3, 1998

(51) Int. Cl.$^7$ ...................................... C08F 4/06
(52) U.S. Cl. ........................... 526/93; 526/94; 526/240; 526/287; 526/318.2; 526/318.3
(58) Field of Search ............... 526/93, 94, 318.2, 526/287, 318.3, 240

(56) References Cited

U.S. PATENT DOCUMENTS

| | | | |
|---|---|---|---|
| 2,531,408 | * 11/1950 | D'Alelio | 526/318.2 |
| 2,541,011 | * 2/1951 | Caldwell | 526/318.2 |
| 2,753,318 | * 7/1956 | Maeder | 526/318.2 |
| 2,819,189 | * 1/1958 | Suen | 526/318.2 |
| 3,206,421 | * 9/1965 | Victorius | 526/318.2 |
| 3,410,941 | * 11/1968 | Dagon | 526/318.2 |
| 3,505,290 | * 4/1970 | Mazzolini | 526/318.2 |
| 3,672,866 | 6/1972 | Damiano . | |
| 3,723,571 | 3/1973 | Haskell . | |
| 3,922,255 | 11/1975 | Koestler et al. . | |
| 3,937,775 | 2/1976 | Horikiri et al. | 264/29 |
| 3,944,638 | 3/1976 | Beatty | 264/5 |
| 3,988,919 | 11/1976 | Talmi et al. | 73/23.1 |
| 4,049,608 | 9/1977 | Steckler et al. . | |
| 4,130,525 | 12/1978 | Kobashi et al. . | |
| 4,138,383 | 2/1979 | Rembaum et al. . | |
| 4,221,862 | 9/1980 | Naito et al. | 430/536 |
| 4,255,286 | 3/1981 | Berek et al. | 252/448 |
| 4,269,760 | 5/1981 | Wakimoto et al. . | |
| 4,435,524 | 3/1984 | Dinbbergs | 521/65 |
| 4,439,349 | 3/1984 | Everett et al. | 502/180 |
| 4,458,057 | 7/1984 | Basu | 526/88 |
| 4,546,146 | 10/1985 | Kobashi et al. | 524/831 |
| 4,859,711 | 8/1989 | Jain et al. | 521/56 |
| 4,861,818 | 8/1989 | Timmerman et al. | 524/460 |
| 5,043,407 | 8/1991 | Hasegawa et al. | 526/307.6 |
| 5,059,639 | 10/1991 | Ohkura et al. | 523/205 |
| 5,252,692 | 10/1993 | Lovy et al. | 526/342 |
| 5,314,974 | 5/1994 | Ito et al. | 526/206 |
| 5,356,985 | 10/1994 | Sackmann et al. | 524/460 |
| 5,369,132 | 11/1994 | Ito et al. | 521/31 |
| 5,412,048 | 5/1995 | Longley et al. | 526/212 |

FOREIGN PATENT DOCUMENTS

| | | | |
|---|---|---|---|
| 451708 | 8/1974 | (AU) | 35/3 |
| 212956 B | 1/1984 | (CZ) | 35/4 |
| 2324154 | 11/1973 | (DE) | 36/3 |
| 4304026 | 9/1993 | (DE) | 49/1 |
| 2280898 A | 5/1995 | (GB) . | |
| 50148292 | 11/1975 | (JP) | 61/2 |
| 50148293 A | 11/1975 | (JP) | 60/2 |
| 59064511 A | 4/1984 | (JP) . | |
| 60103355 A | 6/1985 | (JP) | 74/3 |
| 61026505 A | 2/1986 | (JP) . | |
| 62270631 A | 11/1987 | (JP) . | |
| 63010603 A | 1/1988 | (JP) . | |
| 63105035 A | 5/1988 | (JP) . | |
| 63142066 A | 6/1988 | (JP) . | |
| 49054413 A | 8/1993 | (JP) | 36/6 |
| 50072891 A | 9/1993 | (JP) . | |
| 57171721 A | 9/1993 | (JP) | 40/2 |
| 57171722 A | 9/1993 | (JP) | 40/2 |
| 05139711 A | 11/1993 | (JP) . | |
| 05254814 A | 12/1993 | (JP) . | |
| 06256438 | 9/1994 | (JP) . | |
| 06256438 A | 9/1994 | (JP) | 35/4 |
| 06228212 A | 12/1994 | (JP) | 35/4 |
| 14379414 A | 5/1989 | (SU) . | |
| 1836138 A3 | 8/1993 | (SU) . | |
| WO 90/11889 A | 10/1990 | (WO) | 37/6 |
| WO 91/00930 | 1/1991 | (WO) | C22B/1/20 |

OTHER PUBLICATIONS

Boucher, E., et al. Effect of Heat Treatment On The Morphology And Structure Of Crystals, Etc. J. Polym. Sci, Part A–2, 1285–96 (1972)., (Abstract Only).

Muratova, I., et al. Study Of The Shape Factor Of Particles Of Vinyl Chloride And Acrylate Powders, Khim. Prom–st., Ser.: Proizvod. Pererab. Plastmass Sint. Smol, 36–40 (1981), (Abstract Only).

Almog, Y., et al. Monodisperse Polymeric Spheres In The Micron Size Range By A single Step Process, Br. Polym. J., 131–6 (1982), (Abstract Only).

(List continued on next page.)

Primary Examiner—Bernard Lipman
(74) Attorney, Agent, or Firm—Howrey Simon Arnold & White

(57) ABSTRACT

The present invention is an acrylic polymer particle which is consistently and substantially spherical in shape and which has a mean diameter that can be predetermined from about 30 microns in diameter to about 5 microns or less. Polyacrylonitrile is synthesized in an aqueous dispersion polymerization with a ionic monomer or "surfmer" to attain a narrow particle size distribution with a mean diameter as low as approximately 3±1.5 microns which is characteristic of an emulsion polymerization. The polymer comprises the ionic monomer and, optionally, a neutral comonomer. The mean particle size is dependent on the concentration of the ionic monomer present, the particular ionic monomer or monomers selected, and the counterion associated with the ionic monomers, the persulfate initiator, and the bisulfite activator. The counterions, often sodium ions, can be removed from the polymer particles by ion exchange with quaternary ammonium compounds.

24 Claims, No Drawings

OTHER PUBLICATIONS

Csomorova, K., et al, Polymerization Of Methyl Methacrylate And Carbonization Of Poly (Methyl Methacrylate) In The Presence Of Magnesium Perchlorate, Collect. Czech. Commun. 393–400 (1979), (Abstract Only).

Goto, S., et al, Evaluation Of Microcapsules, J. Microencapsulation 293–304 (1986) (Abstract Only).

Bhattacharyya, B. et al, Application Of Monodisperse Functional And Fluorescent Latex Particles, Polym. News 107–14 (1977), (Abstract Only).

Guyot, A., et al.; Reactive Surfactants in Emulsion Polymerization; Polymer Synthesis, pp. 44–65 (Advances in Polymer Science, vol. III, Springer–Verlag Berlin Heidelberg 1994).

Wade, B., et al.; Polymerization; Acrylic Fiber Technology and Applications, pp. 37–59; (Ed. by James C. Masson, JCM Consulting, Mooresville, North Carolina; Marcel Dekker, Inc. 1995).

Frushour, B.; Acrylic Polymer Characterization in solid State and Solution; Acrylic Fiber Technology and Applications, pp. 233–242; (Ed. by James C. Masson, JCM Consulting, Mooresville, North Carolina; Marcel Dekker, Inc. 1995).

PCT Search Report for PCT/US99/06783.

* cited by examiner

POLYACRYLONITRILE PARTICLES BY SURFMER POLYMERIZATION AND SODIUM REMOVAL BY CHEMICAL EXCHANGE

BACKGROUND OF THE INVENTION

1. Field of the Invention

The present invention relates generally to the fields of synthesis of polyacrylonitrile particles in an aqueous dispersion polymerization with a ionic comonomer or "surfmer" to attain essentially spherical polyacrylonitrile polymer particles with a narrow and predetermined particle size distribution. The mean particle size is directly proportional to the concentration of ionic comonomer, to the particular ionic comonomer selected, and to the counterions associated with the ionic comonomers, persulfate initiator, and bisulfite activator. This process facilitates control of polymer particle size when the polymer must contain an elevated number of dye sites. An elevated number of dye sites facilitates attaching functional molecules to the polymer, and it allows aqueous dispersion polymerization process to proceed at far lower polymer to water ratios than do normal aqueous polymerization processes. If too great a concentration of particular ionic comonomers are incorporated, the polymer particles may be too small to be efficiently filtered and must be separated by more costly centrifugal methods. At the same time, there are applications for polyacrylonitrile particles of a small uniform diameter. Polyacrylonitrile particles below 5 microns have utility in battery applications. The polymer particle is useful after conversion to a carbon powder for lithium-ion-carbon battery formulations. The important features of the polymer particles for use in advanced battery applications are a small mean particle size of less than 5 microns, a narrow particle size distribution, an essentially spherical shape, and low sodium content.

2. Description of Related Art

Acrylonitrile and its comonomers can be polymerized by a number of well-known free-radical methods. All commercial processes are based on free radical polymerization because it gives the combination of polymerization rate, ease of control, and properties including whiteness, molecular weight, linearity, and the ability to incorporate desired comonomers and, in most cases, dye sites. By far the most widely used method of polymerization in the acrylic fibers industry is aqueous dispersion polymerization or suspension polymerization. Aqueous dispersion polymerization, a variant of suspension polymerization, is the most common commercial method. Water is the continuous phase. Water acts as a convenient heat transfer and cooling medium and the polymer is very easily recovered by filtration or centrifugation. The initiators and dispersants used in dispersion polymerization are soluble in water, while those in suspension polymerization are water insoluble. Polyacrylonitrile particles made by these processes grow primarily by agglomeration of smaller particles.

Emulsion polymerization, on the other hand, is used primarily where a high level of a water-insoluble monomer is used and therefore the propagating macroradicals are isolated from each other. Encounters between macroradicals are hindered as a consequence and termination reactions are less frequent. In this process agglomeration of smaller particles is less a factor in polymer particle growth. Therefore the particle size distribution is more a function of the initial micelle size. However, it is difficult to incorporate water soluble comonomers into the polymer in an emulsion polymerization. In addition, the composition of the polymer will often change as monomers are selectively incorporated into the polymer and subsequently become deficient in the adhering monomer layer.

Acrylonitrile polymers are made from polymers of acrylonitrile that usually contain other comonomers. Nearly all acrylic fibers are made from acrylonitrile copolymers containing one or more additional monomers that modify the properties of the fiber. Neutral comonomers including methyl acrylate, methyl methacrylate, or vinyl acetate are used to modify the solubility of the acrylic copolymers in spinning solvents such as dimethyl acetamide, to modify the acrylic fiber morphology, and to improve the rate of diffusion of dyes into the acrylic fiber. Despite its disadvantages of low reactivity and difficulty in polymer control and chain transfer in polymerization, vinyl acetate is increasingly the comonomer of choice for acrylic fibers, primarily because of its low cost.

Dyes can attach to the polymer at end groups and where ionic functional groups are available. Fiber dyeability is critically dependent on the molecular weight distribution of the polymer because most acrylic fibers derive their dyeability from sulfonate and sulfate initiator fragments at the polymer chain ends. Thus, the dye site content of the fiber is inversely related to the number average molecular weight of the polymer and very sensitive to the fraction of low molecular weight polymer. With the trend to finer denier fibers where more dye is required to achieve a given color, the need for dye sites is increased. Over the years, many producers have gradually lowered the molecular weight of their polymer increase dyeability. The total number of dye sites required to be able to dye a full range of shades with cationic dyes is 30 to 50 milliequivalents per kilogram (meq/kg) depending on the fiber denier and structure. Dry-spun fibers and microdenier fibers require a minimum of 40 meq/kg of dye sites.

Where the number provided by the end groups is inadequate, a sulfonate-containing monomer may be used to provide additional dye sites within the polymer structure. Carboxylic monomers have also been employed as dye receptors. Ionic comonomers such as sodium p-styrenesulfonate, sodium methallyl sulfonate, sodium p-sulfophenyl methallyl ether, sodium 2-methyl-2-acrylamidopropane sulfonate, or itaconic acid may be added to provide dye sites apart from end groups and to increase the hydrophilic character. These dye site comonomers contain sulfonate or carboxylate functional groups and a hydrocarbon functional group. They therefore have some capacity to act as surfactants. The name surfmer, which is another term for surfactant monomer or ionic monomer, has been coined for surfactant molecules that also act as a comonomer that is able to participate in a propagation reaction.

These materials react to produce polymeric chains that fold upon themselves to form spheres. The spheres are generally several tens of microns in diameter, primarily due to agglomeration of smaller particles. Agglomeration can be partially controlled by the use of surfactants or ionic monomers. Surfactants and ionic monomers generally include counterions, often a cation such as sodium.

Polyacrylonitrile particles of various sizes have utility in a variety of applications. It is known in the art to produce carbon materials, typically fibers, by carbonization of acrylic or acrylonitrile polymers in fiber form. It has recently been discovered that acrylic polymers in small particulate form (1.5 to 4.5 microns) may be carbonized to form a material useful in battery applications. In the carbonization process, uniformity of the particle shape is essential for good result;

however, prior art microparticle acrylics are made simply by crushing bigger particles and therefore have no uniformity of shape. In addition, sodium ions are detrimental to this carbonization process. Surfactants absorbed onto the polymer particles cause sodium ions to also be attached to the polymer particles.

SUMMARY OF THE INVENTION

The present invention relates to a method of making an acrylic polymer particle which is consistently and substantially spherical in shape and which has a predetermined mean particle diameter. Substantially spherical is defined as the diameter measured in any direction is within 20% of any other diameter measurement on the same particle, with the particle at rest. Polymer particles comprising acrylonitrile, an ionic comonomer or "surfmer," and a neutral comonomer have been synthesized in an aqueous dispersion polymerization to attain a narrow particle size distribution with a mean diameter that is variable from about 35 microns characteristic of an aqueous dispersion polymerization to about 3 microns characteristic of an emulsion polymerization.

A "neutral comonomer" is a non-ionic comonomer which does not add ionic functional groups that can act as dye sites. Those neutral comonomers listed in the background section of this application are incorporated here by reference. Vinyl acetate is the preferred organic comonomer used in the polymerization with acrylonitrile. Vinyl acetate is a modifying comonomer which improves solubility of the acrylic polymer in the spinning solvent, dimethyl acetamide, and imparts other desirable properties to the polymer.

This invention requires that an ionic monomer be incorporated into the polymer at a concentration above that normally used in the industry to achieve dyeability. One purpose of the invention is to reduce the average particle size for a particular end use application that requires such particles. The various ionic comonomers have varying degrees of effectiveness at reducing the average polymer particle. The ionic comonomer sodium methallyl sulfonate is particularly effective at reducing the average particle size of polyacrylonitrile polymers. The same mean particle size can be achieved with greater concentrations of other ionic comonomers. For instance, itaconic acid is less effective than many sulfonate-based ionic comonomers at reducing particle size but it may be preferred in many instances.

Small particle size is a detriment to producing raw polymer if the required number of ionic dye sites is such that with sodium methallyl sulfonate the particle size is too small to readily collect by filtration, and provided the ultimate application does not require small size. In this case other ionic monomers can be used. For instance, sodium p-sulfophenyl methallyl ether can also be used to provide a sulfonate functional group without realizing the same degree of particle size reduction as is observed with similar concentrations of sodium methallyl sulfonate. Therefore, a surfmer type polymerization using sodium p-sulfophenyl methallyl ether does not yield particle diameters as small as those produced that contain equivalent concentrations of sodium methallyl sulfonate.

Itaconic acid, which contains two carboxylic acid groups, is preferred in some applications principally because of cost. It also is much less effective than is sodium methallyl sulfonate at reducing particle size, but it may be preferred based on the cost and the desired loading of dye sites if the desired particle size is greater than about 5 microns in diameter. Any of the sulfonate based and carboxylate based ionic monomers are effective at reducing particle size, and the preferred ionic monomer may depend on reactant costs, the plant efficiency at processing a particular sized particle, and the desired number of dye sites per kilogram of polymer.

Surprisingly, the counterions associated with the ionic monomer, persulfate initiator, and bisulfite activator also influence particle size of polymers. Experiments have shown that incorporation of approximately 4% by weight of itaconic acid (620 meq/kg polymer carboxylate ion) that has sodium counterions from the sodium persulfate initiator, the sodium bisulfite activator, and possibly other sources, will give a particle that is approximately 10 microns in diameter. The same particle size is achieved with incorporation of only 2.5% by weight of itaconic acid (380 meq/kg polymer carboxylate ion) if the polymerization utilizes itaconic acid in a solution that contains ammonium from ammonium persulfate, ammonium bisulfite, and other sources, as the principle counterion. A similar result would be achieved if ammonium salts were added in sufficient quantity that the cations normally associated with the polymerization ingredients are essentially replaced in the solution by ammonia. On tests where polymer particles were made incorporating 2.5% by weight itaconic acid (380 meq/kg polymer carboxylate ion) with a sodium counterion, the mean particle size was about 17 microns in diameter.

The relationship between the weight fraction of the polymer that is an ionic comonomer and the particle size is straightforward. The data in Table 1 was developed for itaconic acid in a polymerization with sodium counterions.

TABLE 1

Polymer Particle Mean Diameter Versus Itaconic Acid Concentration

| Itaconic Acid wt. % | Carboxylate Ion, meq/kg polymer | Vinyl Acetate wt. % | Mean Particle Size, Microns |
| --- | --- | --- | --- |
| 4.4 | 680 | 0.9 | 9.0 |
| 4.0 | 620 | 0.0 | 9.6 |
| 3.7 | 570 | 2.2 | 12.2 |
| 2.8 | 430 | 1.9 | 13.7 |
| 2.3 | 350 | 3.1 | 17 |
| 0.9 | 140 | 3.7 | 25 |

The data show a linear relationship over the range of concentrations tested with the mean particle diameter decreasing by about 4.6 microns for each additional weight percent of itaconic acid or, alternatively, for each additional 154 meq/kg of carboxylate ions, incorporated into the polymer. The neutral comonomer, vinyl acetate, has no apparent effect on the mean particle size of the polymers.

Less complete data for sodium methallyl sulfonate suggest that the mean particle diameter decreases by about 9.7 microns for each additional weight percent of sodium methallyl sulfonate incorporated into the polymer. The smallest mean particle diameter achieved is about 3 microns, though the particle size should continue to decrease, at a lesser rate, with the incorporation of additional ionic monomer into the polymer. Alternatively, the addition of ammonia such that ammonium ions replace sodium ions as the associated cation should also result in smaller sizes. The mean particle diameter can be predetermined by adding a predetermined quantity of a given ionic monomer.

It is a second object of this invention to allow the incorporation of elevated levels of dye sites while controlling the particle size so that filtration can be used to separate the polymer from the water. An ionic comonomer will provide at least one dye site. An elevated number of dye sites is useful because it has recently been discovered that functional molecules—such as those that impart antimicrobial activity, or those that alter the Theological properties of the polymer—can be substituted onto the ionic functional group of the ionic comonomer.

Generally less than 50 meq/kg of polymer is needed to fix dyes to the polymer. For purposes of attaching functional molecules to the polymer, the quantity of dye sites should be greater than the quantity required for dye fixing. This quantity may range from about 100 meq of dye sites per kilogram of polymer (meq/kg) to about 1000 meq/kg of polymer. For making small (about 5 microns or less) polymer particles, the preferred range is about 250 meq/kg to about 1000 meq/kg, depending on the ionic monomer selected.

For having dye sites available to exchange functional groups onto, there must be at least about 50 meq/kg more than is required for dye. This leads to a minimum number of dye sites of about 100 meq/kg. As a practical matter, not all dye sites exchange with a derivatizing unit onto polymer, and a certain loading of a derivatizing agent may be necessary to impart the desired properties to the polymer. The preferred minimum number of dye sites is about 150 meq/kg, and the more preferred minimum number or dye sites is about 200 meq/kg. The maximum number of dye sites is not important, provided the manufacturing equipment can process smaller polymer particles. For most applications, such as for exchanging antimicrobial agents onto available dye sites in the polymer, approximately 1000 meq/kg should suffice. Incorporating ionic monomer into a polymer involves an incremental cost increase, and for many applications less than 1000 meq/kg of dye sites, such as 800 meq/kg, and for many applications, less than about 600 meq/kg of dye sites would be required. If more than one derivatizing agent is needed, the required maximum number of dye sites may be higher than 1000 meq/kg. If a ionic monomer especially effective at reducing polymer particle size, such as methallyl sulfonate, is used, loading the polymer with more than about 400 meq/kg will result in polymer particles that are difficult to filter from the aqueous solution. In this case, to make polymer particles that are about 3 microns in diameter, the quantity of ionic monomer added to the polymer should range from about 240 meq/kg to about 280 meq/kg of polymer.

This high loading of ionic comonomers will create very small particles that are difficult to filter unless particular ionic comonomers are selected. Selecting weaker sulfonate and carboxylate based ionic comonomers will provide larger particles. The preferred dye site usually contains a sulfonate (~SO$_3$X, where X is any suitable cation and is often an alkali metal) functional group. Sulfate and carboxylate functional groups are also acceptable dye sites and may be preferred in some applications. Each sulfonate based ionic comonomer does not have identical effects on the size of the particles. The selection of ionic comonomers will depend on the concentration of dye sites needed and the filter characteristics at a plant.

The presence of the high concentration of ionic monomer in the polymer and in the medium also allows the use of very low water-to-monomer ratios. If the quantity of ionic monomer is high, i.e., near 4% by weight, water to monomer ratios as low as 2.0:1 can be used. If the ionic monomer used is sodium methallyl sulfonate a water to monomer ratio of 1.5:1 can be run. Typically, it is not possible to go below a 2.5:1 ratio in the standard formulation that contains sodium p-sulfophenyl methallyl ether. The benefit of the lower water-to-monomer ratio is that the facility has greater production rates from a given reactor and that denser polymer particles are produced which are easier to dry.

The reaction takes place usually, though not necessarily, in a continuously stirred tank reactor.

The aqueous dispersion polymerization utilizing high concentrations of surfmer provides a polymer particle that is essentially spherical in shape, with a small diameter, and that has a narrow particle size distribution. The surfmer obtains this result through several mechanisms. Acrylonitrile polymers that are synthesized in an aqueous dispersion grow by agglomeration of very small polymer particles that are initiated in the aqueous solution. These particles are hydrophobic and therefore agglomerate. The surfmer has the effect of changing the character of the particle to a more hydrophilic nature and therefore reduces agglomeration to essentially zero. So the primary growth mechanism is the growth by incorporation of monomers onto the polymer. The surfactant better isolates the propagating macroradicals in micelles, thereby hindering encounters between macroradicals. Therefore, there is less monomer material available for growth from each collision between a growing particle and a monomer-containing micelle. The surfmer also prevents free radical initiators from readily absorbing onto the surface of the polymer particles and initiating secondary growth, instead shifting this reaction to the water phase where new particles are formed. Finally, the more sulfonate groups present, the greater the restriction to acrylonitrile diffusion into the particle. The overall effect is to have a small mean particle diameter and a narrow particle size distribution even if the reaction takes place in a continuously stirred tank reactor. The large quantity of surfmer incorporated into the polymer gives the polymer a large number of dye sites and a large quantity of sodium that is ionically bound within the polymer.

One potential disadvantage to this process is that the cation that usually is ionically bound to the ionic functional group, usually sodium, is detrimental for some uses. In particular, sodium is detrimental if it is desired to convert the polyacrylonitrile particles to carbon particles. The removal of metals is important in improving carbon yield from such polymers and improving carbon fiber processing for battery applications. While it may be possible in some applications to utilize ionic monomers that have ammonium counterions, in other applications this may result in an unacceptably small particle size. The cation ionically bound to the sulfonate or carboxylate containing comonomer, as well as the cation ionically bound to the sulfonate and sulfate end groups, can be exchanged with a quaternary ammonium salt. Protonated amines, such as tetramethyl ammonium quaternary salt, tetrabutyl ammonium quaternary salt, and Larostat 264A (also herein called Larostat) which is the quaternary ammonium salt of a dimethyl fatty acid amine made from soybean oil, are successfully used to exchange with the counterions on the available sulfate, sulfonate, and carboxylate functional groups in acrylic polymers.

The commercially available antistat, Larostat 264A, is a preferred compound to exchange the sodium from the polymer when the subsequent use of the polymer involves carbonization. The incorporation of Larostat broadens the exotherm that occurs in stabilization prior to carbonization, and can help prevent polymer particle to particle or fiber to fiber fusion during stabilization leading to carbonization. It also seems to reduce amorphous density and improve the range of fiber orientation (stretch ratio) during fiber formation and drawing.

The preferred method of exchanging out the sodium from the polymer is by washing the polymer, by chemical exchange with the acrylic polymer in a slurry, at a temperature near or above the wet glass transition point of the polymer. The glass transition is the temperature range over which a glassy polymer becomes rubbery. Other changes that occur at the glass transition are pronounced increases in specific volume, heat capacity, and diffusion rate of absorbed molecules. In dyeing operations it is often necessary to be above the glass transition of the wet fiber so that the dye molecules can diffuse into the fiber and reach the dye sites. This elevated temperature facilitates diffusion into and out of the polymer particle. The incorporation of neutral comonomers, preferably vinyl acetate, into the polymer as an additional comonomer also facilitates diffusion into and out of the polymer particle.

DESCRIPTION OF ILLUSTRATIVE EMBODIMENTS

The following examples are included to demonstrate several preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

An example of a continuous aqueous dispersion process follows. A 3.5 liter continuously stirred (with two 6-blade 45 degree impellers rotating at 600 rpm) tank reactor was held at a temperature of 55 degrees Centigrade. A number of feed streams were introduced into the reactor at rates such that the average residence time was 60 minutes. The pH was kept near 3. The composition of the total feed is given in Table 2.

Polymerization is initiated by feeding aqueous solutions of sodium persulfate (oxidizer, initiator) sodium bisulfite (reducing agent, activator), ferrous or ferric iron (redox catalyst), and sulfuric acid (for pH control). These conditions resulted in 86.5% conversion of monomer to polymer. The final polymer contained 3.1 weight percent of sodium methallyl sulfonate (200 meq/kg polymer sulfonate ion), 3.9 weight percent of vinyl acetate, and the balance acrylonitrile. The mean particle size was 2.8 microns, with a bell shaped distribution that had 10 weight percent of the particles below 1.3 microns and 10 weight percent of the particles above 5.7 microns.

TABLE 2

Total Feed Composition

| Compound | Quantity | Units |
|---|---|---|
| Acrylonitrile monomer | 91.2 | parts |
| Vinyl acetate monomer | 4.6 | parts |
| Sodium methallyl sulfonate | 4.2 | parts |
| Water | 150.0 | parts |
| Sodium persulfate (initiator) | 0.64 | % based on monomer |
| Sodium bisulfite as sulfur dioxide (activator) | 0.83 | % based on monomer |
| Iron (Ferrous or Ferric) | 6.0 | parts per million of monomer |
| Sulfuric acid | trace | |

A second test with essentially the same feed streams and conditions resulted in 86.5% conversion of monomer to polymer. The final polymer contained 3.1 weight percent of sodium methallyl sulfonate, 4.0 weight percent of vinyl acetate, and the balance acrylonitrile. The mean particle size was 2.8 microns, with a bell shaped distribution that had 10 weight percent of the particles below 1.3 microns and 10 weight percent of the particles above 6.9 microns.

EXAMPLE 2

An example of a continuous aqueous dispersion process with a different ionic monomer follows. A 3.5 liter continuously stirred (with two 6-blade 45 degree impellers rotating at 400 rpm) tank reactor was held at a temperature of 50 degrees Centigrade. A number of feed streams were introduced into the reactor at rates such that the average residence time was 75 minutes. The pH was kept near 3.15. The composition of the total feed is given in Table 3.

These conditions resulted in 82.7% conversion of monomer to polymer. The final polymer contained 5.0 weight percent of sodium p-sulfophenyl methallyl ether (200 meq/kg polymer sulfonate ion), 4.2 weight percent of vinyl acetate, and the balance acrylonitrile. The mean particle size was 28 microns, with a bell shaped distribution that had 10 weight percent of the particles below 11 microns and 10 weight percent of the particles above 56 microns. These particle sizes are an order of magnitude larger than was observed with sodium methallyl sulfonate as the surfmer, even though both polymers contained about 200 meq/kg of sulfonate functional groups.

TABLE 3

Total Feed Composition

| Compound | Quantity | Units |
|---|---|---|
| Acrylonitrile monomer | 89.5 | parts |
| Vinyl acetate monomer | 5.0 | parts |
| Sodium p-sulfophenyl methallyl ether | 5.5 | parts |
| Water | 250.0 | parts |
| Sodium persulfate (initiator) | 0.65 | % based on monomer |
| Sodium bisulfite as sulfur dioxide (activator) | 1.46 | % based on monomer |
| Iron (Ferrous or Ferric) | 1.6 | parts per million of monomer |
| Sulfuric acid | trace | |

EXAMPLE 3

An example of a continuous aqueous dispersion process with a different surfmer follows. A 3.5 liter continuously stirred (with two 6-blade 45 degree impellers rotating at 600 rpm) tank reactor was held at a temperature of 50 degrees Centigrade. A number of feed streams were introduced into the reactor at rates such that the average residence time was 75 minutes. The pH was kept near 3.0. The composition of the total feed is given in Table 4.

TABLE 4

Total Feed Composition

| Compound | Quantity | Units |
|---|---|---|
| Acrylonitrile monomer | 97.0 | parts |
| Vinyl acetate monomer | 0.0 | parts |
| Itaconic acid | 3.0 | parts |

TABLE 4-continued

Total Feed Composition

| Compound | Quantity | Units |
|---|---|---|
| Water | 250.0 | parts |
| Sodium persulfate (initiator) | 0.33 | % based on monomer |
| Sodium bisulfite as sulfur dioxide (activator) | 0.74 | % based on monomer |
| Iron (Ferrous or Ferric) | 1.6 | parts per million of monomer |
| Sulfuric acid | trace | |

These conditions resulted in 60% conversion of monomer to polymer. The final polymer contained 4.0 weight percent of itaconic acid (620 meq/kg polymer carboxylate ion) and the balance acrylonitrile. The mean particle size was 9.6 microns, with a bell shaped distribution that had 10 weight percent of the particles below 1.8 microns and 10 weight percent of the particles above 25 microns.

EXAMPLE 4

A second example of a continuous aqueous dispersion process with itaconic acid and a small quantity of vinyl acetate show that vinyl acetate has little effect on particle size but does increase conversion. A 3.5 liter continuously stirred (with two 6-blade 45 degree impellers rotating at 600 rpm) tank reactor was held at a temperature of 50 degrees Centigrade. A number of feed streams were introduced into the reactor at rates such that the average residence time was 75 minutes. The pH was kept near 2.94. The composition of the total feed is given in Table 5.

These conditions resulted in 81% conversion of monomer to polymer. The final polymer contained 4.4 weight percent of itaconic acid (680 meq/kg polymer carboxylate ion), 0.9 weight percent of vinyl acetate, and the balance acrylonitrile. The mean particle size was 9.0 microns, with a bell shaped distribution that had 10 weight percent of the particles below 1.6 microns and 10 weight percent of the particles above 28 microns.

TABLE 5

Total Feed Composition

| Compound | Quantity | Units |
|---|---|---|
| Acrylonitrile monomer | 94.8 | parts |
| Vinyl acetate monomer | 1.2 | parts |
| Itaconic acid | 4.0 | parts |
| Water | 250.0 | parts |
| Sodium persulfate (initiator) | 0.38 | % based on monomer |
| Sodium bisulfite as sulfur dioxide (activator) | 0.86 | % based on monomer |
| Iron (Ferrous or Ferric) | 1.6 | parts per million of monomer |
| Sulfuric acid | trace | |

EXAMPLE 5

In this example polymer particles manufactured in a solution that favored incorporation of sodium counterions are exchanged with Larostat under various conditions and the quantity of sodium removed from the polymer particle is determined. The theoretical amount of Larostat needed to exchange the sodium in the polymer was 0.286 grams of 35% by weight Larostat per gram of polymer. Two grams of deionized water were also used per gram of polymer. The water and Larostat are brought to a boil and the polymer is added. The heat is removed and the solution was cooled over 15 minutes. The polymer was then filtered and the liquid discarded. An additional six grams of deionized water was used to wash each gram of polymer on the filter. The unwashed polymer had about 5100 parts per million by weight of sodium in the polymer, while the exchanged polymer contained only 636 parts per million by weight of sodium.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method of preparing polymer particles comprising polyacrylonitrile in a single stage aqueous dispersion polymerization process, comprising polymerizing acrylonitrile monomer with an ionic monomer, wherein the ionic monomer comprises salts of p-styrenesulfonate, p-sulfophenyl methallyl ether, 2-methal-2-acrylamidopropane sulfonate, itaconic acid, or mixtures thereof having at least one dye site, wherein the weight-to-weight ratio of water to monomer in the feed is about 2.0:1 or less, and wherein the quantity of ionic monomer added is such that the number of dye sites incorporated into the polymer from the ionic monomer added range from about 100 meq/kg of polymer to about 1,000 meq/kg of polymer.

2. The method of claim 1 where the weight to weight ratio of water to monomer in the feed is about 1.6:1 or less.

3. The method of claim 1 wherein the ionic monomer comprises a carboxylate functional group or a sulfonate functional group.

4. The method of claim 1 wherein the polymer comprises a neutral comonomer.

5. The method of claim 1 wherein the ionic monomer comprises one or more of itaconic acid or a salt thereof.

6. The method of claim 1 wherein the ionic monomer comprises one or more of methallyl sulfonate or a salt thereof.

7. The method of claim 1 wherein the ionic monomer is comprises one or more of methallyl sulfonate or a salt thereof, and wherein the polymer comprises a neutral comonomer.

8. The method of claim 7 wherein the ionic monomer comprises one or more of methallyl sulfonate or a salt thereof, and the neutral comonomer comprises vinyl acetate.

9. The method of claim 1 wherein the ionic monomer comprises methallyl sulfonate or a salt thereof and the number of dye sites incorporated into the polymer range from about 200 meq/kg to about 400 meq/kg of polymer.

10. The method of claim 1 wherein the ionic monomer comprises one or more of methallyl sulfonate or a salt thereof and the number of dye sites incorporated into the polymer range from about 240 meq/kg to about 280 meq/kg of polymer.

11. The method of claim 1 wherein the ionic monomer comprises one or more of methallyl sulfonate or a salt thereof, the number of dye sites incorporated into the polymer range from about 240 meq/kg to about 280 meq/kg of polymer, and the polymer comprises a neutral comonomer.

12. The method of claim 1 wherein the number of dye sites incorporated into the polymer range from about 150 meq/kg of polymer to about 1000 meq/kg of polymer.

13. The method of claim 1 wherein the number of dye sites incorporated into the polymer range from about 200 meq/kg of polymer to about 600 meq/kg of polymer.

14. The method of claim 1 wherein the number of dye sites incorporated into the polymer range from about 200 meq/kg of polymer to about 800 meq/kg of polymer, and wherein the polymer comprises a neutral comonomer.

15. The method of claim 4 wherein the ionic monomer comprises one or more of p-sulfophenyl methallyl ether or a salt thereof, and the number of dye sites incorporated into the polymer range from about 200 meq/kg of polymer to about 1000 meq/kg of polymer, and wherein the neutral comonomer comprises vinyl acetate.

16. The method of claim 1 wherein the cations associated with one or more of the ionic monomer, the activators, or the initiators, is ammonium.

17. The method of claim 4 wherein the neutral comonomer comprises vinyl acetate.

18. The method of claim 1 wherein the number of dye sites incorporated into the polymer range from about 250 meq/kg of polymer to about 1000 meq/kg of polymer, and wherein the polymer comprises a neutral comonomer.

19. The method of claim 1 wherein the concentration of ionic comonomer incorporated into the polymer is about 4 percent be weight.

20. A method of preparing polymer particles comprising polyacrylonitrile in an aqueous dispersion polymerization process, comprising polymerizing acrylonitrile monomer with an ionic monomer, wherein the weight to weight ratio of water to monomer in the feed is about 2.0:1 or less, and wherein the mean particle size distribution of the polymer particles is about 30 microns or less.

21. The method of claim 20 wherein the mean particle size distribution of the polymer particles is about 17 microns or less.

22. The method of claim 20 wherein the mean particle size distribution of the polymer particles is about 9 microns or less.

23. A method of preparing polymer particles comprising polyacrylonitrile in an aqueous dispersion polymerization process, comprising polymerizing acrylonitrile monomer with an ionic monomer, wherein the ionic monomer comprises at least 1 dye site, wherein the weight-to-weight ratio of water to monomer in the feed is about 2.0:1 or less, and wherein the polymer particles have a mean particle diameter of about 35 microns or less.

24. A method for preparing polymer particles as defined in claim 23 wherein the mean particle diameter is about 10 microns or less.

* * * * *